(12) United States Patent
Pezzullo et al.

(10) Patent No.: US 12,053,946 B2
(45) Date of Patent: Aug. 6, 2024

(54) SEALANT LAYER ASSEMBLY

(71) Applicant: BRIDGESTONE EUROPE NV/SA [BE/BE], Zaventem (BE)

(72) Inventors: Giuseppe Pezzullo, Rome (IT); Francesco Botti, Rome (IT)

(73) Assignee: Bridgestone Europe NV/SA, Zaventem (BE)

( * ) Notice: Subject to any disclaimer, the term of this patent is extended or adjusted under 35 U.S.C. 154(b) by 618 days.

(21) Appl. No.: 17/287,201

(22) PCT Filed: Oct. 14, 2019

(86) PCT No.: PCT/EP2019/077696
§ 371 (c)(1),
(2) Date: Apr. 21, 2021

(87) PCT Pub. No.: WO2020/083681
PCT Pub. Date: Apr. 30, 2020

(65) Prior Publication Data
US 2021/0387432 A1  Dec. 16, 2021

(30) Foreign Application Priority Data

Oct. 22, 2018  (IT) .................. 102018000009657

(51) Int. Cl.
| | |
|---|---|
| *B29D 30/06* | (2006.01) |
| *B29C 73/18* | (2006.01) |
| *B60C 19/12* | (2006.01) |
| *C09J 7/29* | (2018.01) |
| *C09J 7/38* | (2018.01) |
| *C09J 11/06* | (2006.01) |

(52) U.S. Cl.
CPC .......... *B29D 30/0685* (2013.01); *B29C 73/18* (2013.01); *B60C 19/122* (2013.01); *C09J 7/29* (2018.01); *C09J 7/383* (2018.01); *C09J 11/06* (2013.01); *B29D 2030/0695* (2013.01); *C09J 2301/408* (2020.08); *C09J 2400/263* (2013.01); *C09J 2400/283* (2013.01); *C09J 2415/00* (2013.01); *C09J 2423/046* (2013.01); *C09J 2427/006* (2013.01); *C09J 2483/006* (2013.01); *C09J 2491/006* (2013.01)

(58) Field of Classification Search
None
See application file for complete search history.

(56) References Cited

U.S. PATENT DOCUMENTS

| | | |
|---|---|---|
| 2,012,935 A | 8/1935 | Smith et al. |
| 3,260,296 A | 7/1966 | Springer |
| 3,282,319 A | 11/1966 | Barnett |
| 2004/0254276 A1* | 12/2004 | Okada .................. C09J 7/38 |
| | | 524/508 |
| 2011/0052852 A1* | 3/2011 | Samanta ............... C09J 195/00 |
| | | 428/351 |
| 2016/0031269 A1* | 2/2016 | Sakakibara .......... B60C 19/002 |
| | | 152/450 |

OTHER PUBLICATIONS

Waddell, Walter & Tracey, Donald & Rouckhout, Dirk. (2006). Impact of halobutyl rubber innerliners on tire durability. KGK Kautschuk Gummi Kunststoffe. 59. (Year: 2006).*
International Search Authority: International Search Report for co-pending international patent application No. PCT/EP2019/077696 dated Jan. 14, 2020, 4 pages.

* cited by examiner

*Primary Examiner* — Jacob T Minskey
*Assistant Examiner* — Adrianna N Konves
(74) *Attorney, Agent, or Firm* — Patterson Intellectual Property Law, PC

(57) ABSTRACT

A sealant layer assembly which allows a sealant layer to be applied on a tire outside of tire production plants. The assembly comprises a sealant layer to be applied on the surface of an inner liner layer facing the inner cavity of a tire, a net layer arranged on a first surface of the sealant layer, and at least one non-stick protective layer arranged either on a second surface of the sealant layer opposite the first surface or on the net layer.

14 Claims, No Drawings

SEALANT LAYER ASSEMBLY

The invention relates to a sealant layer assembly to allow the sealant layer be applied outside of the tire production line. In this way, a sealant layer can be applied at the premises of tire dealers and also on any type of tire requested by customers, hence without being linked to production limits.

In the tire manufacturing industry, the use of a viscous sealant layer generally arranged in the inner cavity of the tire has been known for a long time. In particular, the sealant layer is arranged in contact with the inner liner layer, in the area of the tread band.

The function of the sealant layer is that of creating a sort of instantaneous "seal" around the object that penetrated the tread, thus preventing air from flowing out of the tire. Furthermore, in case the aforesaid object comes out, the material of the sealant layer has the function of filling the hole left by the object, hence sealing it.

The viscosity of the sealant layer is one of the most important parameters that allow it to effectively carry out the tasks described above. Indeed, the viscosity of the sealant layer must be such as to ensure both the sealing action to be exerted upon the object that penetrated the tread and the hole left by the object itself in a very short time, as discussed above, and its dimensional stability in the inner cavity of the tire during the rolling phase or the standing phase of the tire. Because of its function, the sealant layer is particularly sticky and has low viscosity and, for this reason, hard to be handled when it is separate from the tire. This is why generally the sealant layer, is applied directly on the surface of the inner liner, typically in the tire production line. Owing to the above, limited line-up applying a sealant layer is available on the market for the end user. Furthermore, the adhesion forming between the sealant layer and the inner liner makes it difficult for the sealant layer to be removed from the tire at the end of the life of the sealant layer itself.

Therefore, the need was felt to find a solution capable of allowing the sealant layer to be applied to the tire also by a tire dealer or by an end user, whatever the selected brand and model.

By so doing, end users can be sure that a sealant layer will be available in any tire they choose, hence without being limited by the choices made by manufacturers.

The subject of the invention is a sealant layer assembly which allows a sealant layer to be applied on an inner cavity of a tire on the outside of tire production plants; said assembly comprises: (i) a sealant layer to be applied with its first surface on the surface of an inner liner layer facing the inner cavity of a tire and made up of a rubber layer whose viscosity is such as to create an instantaneous "seal" around an object that penetrated a tread or closing the hole left by the object, (ii) a net layer arranged on said first surface of the sealant layer to be, in use, interposed between the sealant layer and the surface of the inner liner layer facing the inner cavity of the tire, and (iii) one non-stick protective layer arranged on said net layer; said net layer having meshes each of which has an area ranging from 0.25 mm$^2$ to 25 mm$^2$.

It has been experimentally proven that this range of meshes area allows both an effective sealing action of the sealant layer and an effective removal action of the sealant layer by pulling away the net layer.

Hereinafter, sealant layer means a rubber layer to be arranged on the surface of the inner liner facing the inner cavity and whose viscosity is such as to create an instantaneous "seal" around the object that penetrated the tread, thus preventing air from flowing out of the tire or closing the hole left by the object.

Preferably, said assembly comprises a second non-stick protection layer, arranged on a second surface of the sealant layer.

Preferably, the net layer is made of a synthetic or natural polymer material.

Preferably, the net layer is made of a material comprised in the group consisting of polyethylene, polypropylene, polyethylene terephthalate, nylon, Kevlar®, and Rayon.

Preferably, the sealant layer has a thickness ranging from 2 to 5 mm.

Preferably, the non-stick protective layer is a one-sided silicone paper.

Preferably, the protective layer is made of a material chosen in the group consisting of paper, metal film and plastic film on which a surface treatment has carried out; said surface treatment being carried out by a material chosen in the group consisting of silicon, paraffin, fluoropolymers, polyethylene.

Below are some explanatory, non-limiting examples.

A compound was prepared in order to manufacture a sealant layer, whose phr composition is shown in Table I.

TABLE I

| | |
|---|---|
| Halobutyl rubber | 100.0 |
| Carbon black | 40.0 |
| Plasticizer | 240.00 |
| Sulphur | 0.5 |
| Stearic acid | 1.5 |
| Zinc oxide | 1.0 |
| Accelerator | 4.0 |

The halobutyl rubber is a bromobutyl rubber.
The type of carbon black used is identified with N550.
The plasticizer used is naphthenic oil.
The accelerator used is dibenzothiazyl disulfide (MBTS).
The ingredients indicated in Table I were mixed with one another and stirred at a temperature of 100° C. for 10 minutes.

Manufacturing Procedure

According to a non-limiting embodiment, the assembly manufacturing procedure involved a first coupling step to couple a net layer and a non-stick protective paper to one another and, subsequently, a second coupling step, during which a sealant layer is applied to the net layer already coupled to the non-stick protective paper. The process took place at a temperature of 85° C. Preferably, the process must take place at a temperature ranging from 60 to 110° C.

In order to avoid a change of shape of the layer of sealant material (elastic shrinkage or viscous flow phenomena), the temperature was quickly reduced to −5° C. Preferably, during this step, the temperature is reduced below 10° C. and, more preferably, below 0° C., so as to get close to the Tg of the sealant material.

In the example described herein, the net layer used is made of polypropylene, whose meshes have the shape of a rhombus with an area of 9 mm$^2$.

In the example described herein, the non-stick protective layer is a one-sided silicone paper with a 135 g basis weight produced by "Rossella s.r.l.".

After having been manufactured as described above, the assembly was wound so as to form a roll and then stored.

Should manufacturers want to produce and store the assembly in the form of already packed strips with a predetermined length, a further non-stick protective layer must be applied on the sealant layer surface opposite the one where the mesh layer is applied.

Application Procedure

The assembly according to the invention will then be applied on a tire according to the procedure described below:

A strip with suitable dimensions is cut out of the assembly preserved at a low temperature. The strip is heated until it reaches a temperature ranging from 40° C. to 80° C. (preferably 50° C.). Preferably, the heating is obtained by means of an IR radiation (1000 W arranged at a 1 m distance for 20 min), so as to obtain a merely superficial heating, or by means of an oven at 50° C. for 10 minutes.

After the material has been heated up, the non-stick protective layer under the net layer must be removed and material strip must be applied in the desired position on the inner liner (net layer arranged in contact with the inner liner) applying pressure to ensure the adhesion. At this point, the protective layer arranged on the sealant layer is removed as well, if present. At the end of the sealant layer application procedure, the tire is fitted on the rim and inflated up to the operating pressure.

The net layer, for it does not adhere to the inner liner or adheres to it to a smaller extent compared to the sealant layer, can be more easily removed and, by pulling it away from the inner liner, ensures an easier removal of the sealant layer. Therefore, upon disposal of the tire, it is sufficient to make a cut in the sealant layer so as to expose the net layer and, hence, remove it together with the sealant layer.

The invention claimed is:

1. A sealant layer assembly for allowing a sealant layer to be applied on an inner cavity of a tire outside of tire production plants, said assembly comprising:
    a sealant layer configured upon application with a first surface on a surface of an inner liner layer facing the inner cavity of a tire, wherein the sealant layer comprises a rubber layer having a viscosity operable to instantaneously seal around an object that penetrated a tread or closes a hole left by the object;
    a net layer arranged on said first surface of the sealant layer with the net layer and configured to be, in use, interposed between the sealant layer and the surface of the inner liner layer facing the inner cavity of a tire; and
    a non-stick protective layer arranged on said net layer;
    wherein said net layer comprises meshes, each mesh having an area ranging from 0.25 mm$^2$ to 25 mm$^2$.

2. The assembly of claim 1, comprising a second non-stick protection layer arranged on a second surface of the sealant layer.

3. The assembly of claim 1, wherein the net layer comprises a synthetic or natural polymer material.

4. The assembly of claim 1, wherein the net layer meshes comprise a rhombus shape.

5. The assembly of claim 1, wherein the net layer is made of a material from the group consisting of polyethylene, polypropylene, polyethylene terephthalate, nylon, Kevlar®, and Rayon.

6. The assembly of claim 1, wherein said sealant layer has a thickness ranging from 2 to 5 mm.

7. The assembly of claim 1, wherein said non-stick protective layer is a one-sided silicone paper.

8. The assembly of claim 1, wherein said non-stick protective layer comprises at least one material selected from the group consisting essentially of paper, metal film, and plastic film.

9. The assembly of claim 8, wherein said non-stick protective layer is surface treated using at least one material selected from the group consisting essentially of silicon, paraffin, fluoropolymers, and polyethylene.

10. The assembly of claim 1, wherein the sealant layer comprises bromobutyl rubber.

11. The assembly of claim 10, wherein the bromobutyl rubber comprises halobutyl rubber.

12. The assembly of claim 11, wherein the sealant layer further comprises 100 phr halobutyl rubber.

13. The assembly of claim 1, wherein the sealant layer comprises a rubber including an accelerator.

14. The assembly of claim 13, wherein the accelerator is dibenzothiazyl disulfide.

* * * * *